(12) United States Patent
Vijayasankar et al.

(10) Patent No.: US 10,313,991 B2
(45) Date of Patent: Jun. 4, 2019

(54) IMPLICIT EXCHANGE OF CHANNEL INFORMATION FOR UN-SLOTTED CHANNEL HOPPING NETWORKS

(71) Applicant: Texas Instruments Incorporated, Dallas, TX (US)

(72) Inventors: Kumaran Vijayasankar, Allen, TX (US); Arvind Kandhalu Raghu, Plano, TX (US); Jyothsna Kunduru, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/694,196

(22) Filed: Sep. 1, 2017

(65) Prior Publication Data

US 2018/0376437 A1 Dec. 27, 2018

Related U.S. Application Data

(60) Provisional application No. 62/468,774, filed on Mar. 8, 2017.

(51) Int. Cl.
*H04W 56/00* (2009.01)
*H04W 72/04* (2009.01)
*H04L 12/26* (2006.01)
*H04L 5/00* (2006.01)

(52) U.S. Cl.
CPC ......... *H04W 56/001* (2013.01); *H04L 5/0055* (2013.01); *H04L 43/10* (2013.01); *H04W 72/0446* (2013.01)

(58) Field of Classification Search
CPC ............ H04W 56/001; H04W 72/0446; H04L 5/0055; H04L 43/10
See application file for complete search history.

(56) References Cited

U.S. PATENT DOCUMENTS

| | | |
|---|---|---|
| 2003/0045288 A1 | 3/2003 | Luschi et al. |
| 2016/0262098 A1* | 9/2016 | Vijayasankar .... H04W 52/0209 |
| 2016/0330713 A1* | 11/2016 | Vijayasankar ...... H04W 72/005 |

FOREIGN PATENT DOCUMENTS

WO 02056627 A1 7/2002

* cited by examiner

*Primary Examiner* — Afshawn M Towfighi
(74) *Attorney, Agent, or Firm* — Michelle F. Murray; Charles A. Brill; Frank D. Cimino

(57) ABSTRACT

A method of channel access for a radio device in an asynchronous channel hopping wireless network includes a channel hopping coordinator first radio device transmitting its receive (Rx) channel hopping sequence to a fixed or semi-channel hopping sleepy radio device. The sleepy radio device tracks the first radio device's Rx channel using the channel hopping sequence and transmits a poll frame exclusive of a unicast schedule information element (US-IE) on the first radio device's current Rx channel to the first radio device. The sleepy radio device moves to an updated Rx channel that is a function of the current Rx channel. The first radio device receives the poll frame and then computes the updated Rx channel as the function of the current Rx channel. After the computing, the first radio device transmits a data frame to the sleepy radio device on the updated Rx channel.

19 Claims, 3 Drawing Sheets

IMPLICIT EXCHANGE OF CHANNEL INFORMATION FOR UN-SLOTTED CHANNEL HOPPING NETWORKS

FIELD

Disclosed embodiments generally to wireless networks, and more particularly to synchronization in asynchronous (un-slotted) channel hopping in such networks.

BACKGROUND

Institute of Electrical and Electronics Engineers (IEEE) 802.15.4e is an enhanced media access control (MAC) layer protocol of the IEEE 802.15.4 standard designed for low power and low data rate networks. The IEEE 802.15.4e architecture is defined in terms of a number of blocks in order to simplify the standard. These blocks are called layers. Each layer is responsible for one part of the standard and offers services to the higher layers. The interfaces between the layers serve to define the logical links that are described in the standard. A low-rate (LR)-wireless personal area network (WPAN) device comprises at least one physical layer (PHY) which contains the radio frequency (RF) transceiver (or radio) along with its low-level control mechanism, and a MAC sublayer that provides access to the physical channel for all types of transfers. The radio device can either transmit or receive at any given time, but cannot simultaneously perform both transmitting and receiving.

IEEE 802.15.4e is suitable for sensor devices with resource constraints; e.g., low power consumption, low computation capabilities, and low memory. As sensors and actuators that are interconnected by a PAN in home and office environments become more common, limiting the power dissipation for each device is important. Some radio devices may operate on a battery, in which case frequent battery changes or recharges are undesirable. Some other radio devices may operate on a limited amount of power that is generated by the device itself such as using conversion from solar or other light sources, energy scavenging from motion or thermal effects, or collection of energy from ambient electromagnetic fields.

Channel hopping wireless transmission system protocols typically have a retransmission mechanism to retransmit lost frames. When channel hopping is used, subsequent transmissions can use a different channel (frequency band) in the channel hopping sequence. This helps avoid channel interference that may have existed in the previous channel used causing frame loss so that channel hopping can improve network capacity. Channel hopping achieves increased network throughput by promoting simultaneous data transfer over multiple channels between different pairs of radio devices, or to achieve reliability in tough channel conditions by exploiting channel diversity.

Channel hopping can be achieved through many different known methods, with the most common methods used being either a synchronous method called Time Slotted Channel Hopping (TSCH) or an asynchronous method called un-slotted channel hopping (USCH) as defined in the IEEE 802.15.4e standard. Many standards also exist that use a channel hopping MAC to define MAC protocols for different applications. Standards also exist that use a channel hopping MAC to define MAC protocols for different applications. For example the Wi-SUN™ Alliance has published a Field Area Network (FAN) specification that specifies how to use asynchronous channel hopping for smart grid applications (Technical Profile Specification Field Area Network, Wi-SUN Alliance 2014, hereafter the "Wi-SUN FAN").

In USCH (which does not require any synchronization for channel hopping) MACs, such as the one defined in the Wi-SUN FAN, frequency (or channel) hopping is achieved by a device by changing its receive (Rx) channel over different periods of time. The channel hopping sequence is based on a direct hash channel function (DH1CF) as defined in the Wi-SUN FAN specification which generates a pseudo-random sequence of channels based on the extended address of the node, and thus the channel sequence is unique to each node. Each radio device maintains its broadcast schedule as well as a unicast schedule. The radio device will transmit its broadcast data during its broadcast schedule and its neighboring radio devices who are already tracking this radio device are expected to be listening in its channel during the broadcast slot. During the broadcast interval, the radio devices follow their own receiver directed unicast channel hopping schedules. Being asynchronous channel hopping, the unicast channel hopping slots need not be synchronized to each other.

The unicast schedules are receiver directed in the sense that a radio device transmits the frame in the receiver radio device's current channel using carrier sense multiple access with collision avoidance (CSMA/CA). If the frame's data transmission goes beyond the slot period, the transmitting radio device then continues the data transmission into the adjacent slots of the receiver radio device as well. For example, responsive to a data request received from a radio device B, a radio device A may transmit a frame in radio device B's Rx channel and the data transfer from radio device A to radio device B may extend into the adjacent time slot.

There is network overhead needed to maintain proper synchronization in such USCH networks. The exchange of timing information requires the use of specific information elements (IEs) as defined in Wi-SUN FAN specification. There are two specific defined IEs in the Wi-SUN FAN specification. A Unicast Timing IE (UTT-IE) carries the timing information related to a hopping device node's Rx channel sequence needed for a fixed or semi-channel hopping device node to properly track the Rx hopping sequence, and a Unicast Schedule Information Element (US-IE) carries information regarding the channel number currently used by a fixed or semi-channel hopping device node (for generally sleepy device nodes) to the hopping device node.

The following example describes conventional USCH network operation per the Wi-SUN FAN specification. Assume a communication exchange between a coordinator hopping first radio device (first radio device) and a sleepy fixed or semi-channel hopping device node (sleepy radio device). A semi-channel hopping mode device does not channel hop on multiple channels continuously (even when not transmitting or receiving), where it instead hops to different channels only when transmitting or expected to be receiving a frame in response to its transmission of a poll (data request) frame.

The first radio device being a coordinator node can receive frames at any time and so will continue to keep its Rx on according to its hopping sequence. The hopping sequence is only for the hopping device node's Rx. When the first radio device being a hopping device decides to transmit, it will deviate from its Rx channel hopping sequence and transmit a frame on the target destination node's (sleepy radio device's) Rx channel and then return back to its Rx hopping sequence. The sleepy radio device is generally an end device in the network (e.g., a sensor network) that will receive a frame only as a response to its poll frame which it transmits after wake-up, so it does not have to keep its Rx always on.

The sleepy radio device operating on a fixed channel always expects data from the hopping device by an indirect transmission (as defined in IEEE 802.15.4 specification). A fixed radio device operating on a fixed channel will change its Rx channel of operation before every poll interval and may not follow any specific channel sequence. The first radio device being a hopping device changes its Tx channel based on channel information generally provided in a poll frame including a US-IE from the sleepy radio device. The sleepy radio device is able to track the timing of the Rx channel of the hopping device node based on an acknowledgement (ACK) frame with a UTT-IE from the hopping device node.

Thus to convey a sleepy radio device's current Rx channel to the first radio device being a hopping device a US-IE carried in a poll frame is used per the Wi-SUN FAN specification. To convey the first radio device's timing information related to its Rx channel hopping sequence to the sleepy radio device a UTT-IE is carried in all ACK frames and data frames per Wi-SUN FAN specification.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize drawbacks of known USCH network operation per the Wi-SUN FAN specification include a high overhead to maintain network synchronization in terms of bytes of memory needed to support operations. For example, 4 to 6 bytes for a UTT-IE for the first radio device being a channel hopping device to convey timing information related to its Rx channel hopping sequence to the sleepy radio device, and up to 23 bytes for the US-IE to convey the sleepy radio device's current Rx channel to the first radio device, with a UTT-IE required in every data frame and ACK frame from the first radio device, and the US-IE from the first radio device required in every poll frame it transmits after wake-up. These required memory intensive transmissions cause a loss in network performance that can be especially significant for low data rate USCH networks.

Disclosed USCH network synchronization includes implicit exchange of channel information and efficient timing information exchange which each reduce the network overhead for synchronization. In the implicit exchange of channel information a sleepy radio device lets the first radio device know of its current Rx channel which it will receive a response from the first radio device without the sleepy radio device explicitly stating its current Rx channel, which replaces the conventional US-IE for the conveying of this channel information. Another new technique is an efficient timing information exchange based on the elapsed duration measured from the last UTT-IE from the first radio device which reduces the number of UTT-IEs needed for the conveying of timing information to the sleepy radio device, where as described above UTT-IEs are conventionally required from the first radio device in every data frame and ACK frame transmitted to the sleepy radio device.

Disclosed embodiments include a method of channel access for radio devices in an USCH wireless network that includes a channel hopping coordinator first radio device transmitting its Rx channel hopping sequence to a fixed or semi-channel hopping sleepy radio device. The sleepy radio device tracks the first radio device's Rx channel using the channel hopping sequence and transmits a poll frame after wake-up exclusive of a US-IE on the first radio device's current Rx channel to the first radio device. The sleepy radio device moves to an updated Rx channel that is a function of the current Rx channel. The first radio device receives the poll frame and then computes the sleepy radio device's updated Rx channel as the function of the current Rx channel. After the computing, the first radio device transmits a data frame to the sleepy radio device on the sleepy device's updated Rx channel.

BRIEF DESCRIPTION OF THE DRAWINGS

Reference will now be made to the accompanying drawings, which are not necessarily drawn to scale, wherein.

DETAILED DESCRIPTION

Figure 1:
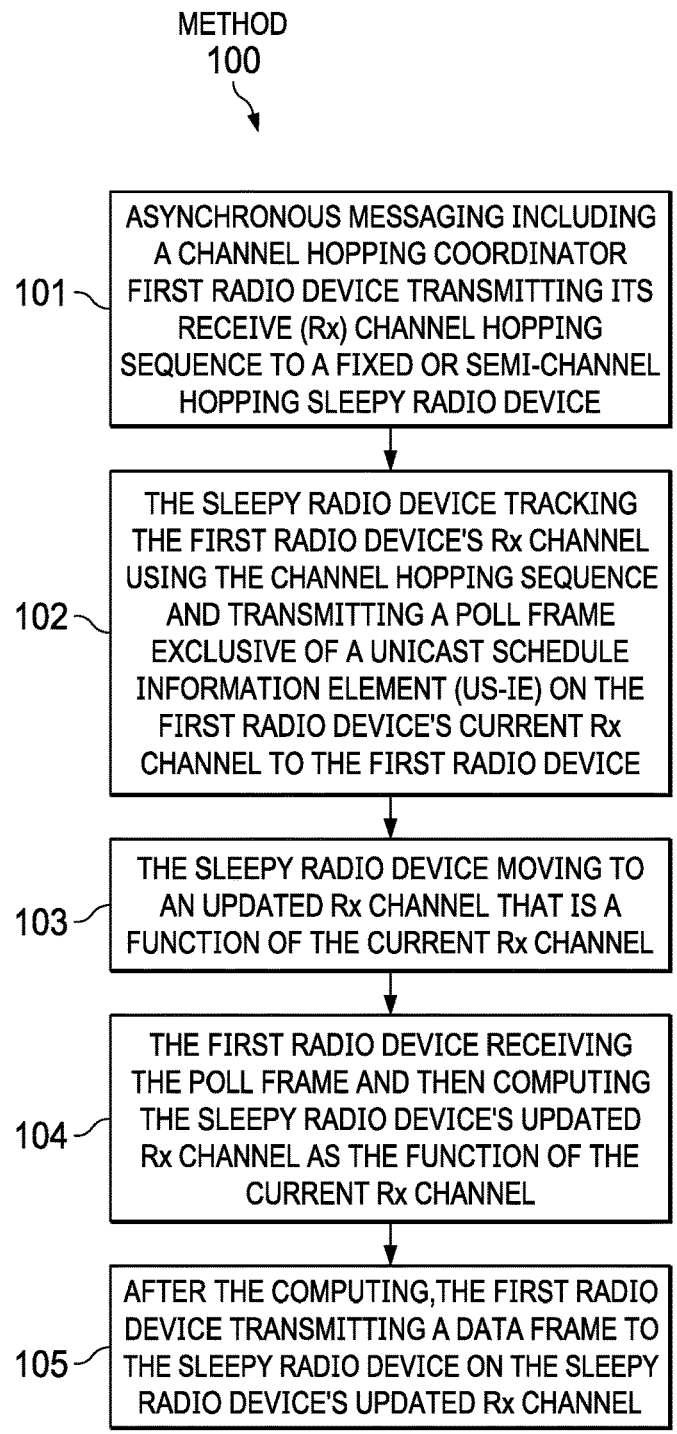
FIG. 1 is a flow chart that shows steps in an example method of USCH network communications including implicit exchange of channel information along with optional efficient timing information exchange for reduced overhead network synchronization, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 is a flow chart that shows steps in an example method 100 of USCH network communications including implicit exchange of channel information along with optional efficient timing information exchange for reduced overhead network synchronization, according to an example embodiment. Step 101 comprises asynchronous messaging including transmitting the first radio device's Rx channel hopping sequence to the sleepy radio device that comprises a fixed frequency or a semi-channel hopping device node. As described above, a semi-channel hopping device means that the device does not hop on multiple channels continuously even when not transmitting or receiving, where the semi-channel hopping device node only hops to a different channel when transmitting or expected to receive a frame in response to a transmitted poll (data request) frame.

Messaging for the step 101 channel exchange is based "Async Transmissions" as defined in the Wi-SUN FAN specification. The initial Async transmission comprises the sleepy radio device transmitting an Async request frame on all allowed channels back-to-back so that the first radio device is bound to be receiving on one of those channels. The first radio device then transmits a response Async frame on all channels so that the sleepy radio device will be receiving on one of them. The received frame from the first radio device carries information regarding its Rx channel hopping pattern (encapsulated in a US-IE, UTT-IE (Unicast schedule IE and Unicast timing and type IE), which enables the sleepy radio device to track the first radio device's Rx channel.

Step 102 comprises the sleepy radio device tracking the first radio device's Rx channel using the channel hopping sequence that it has. Step 103 comprises the sleepy radio device transmitting a poll frame after wake-up exclusive of a Unicast schedule IE to the first radio device on the first radio device's current Rx channel and then moving to an updated Rx channel that is a function of the current Rx channel.

Step 104 comprises the first radio device receiving the poll frame and then computing the sleepy radio device's updated Rx channel as the function of the current initial Rx channel. Step 105 comprises after the computing, the first radio device transmitting a data frame to the sleepy radio device on the sleepy device's updated Rx channel.

Disclosed implicit exchange of channel information using the function in steps 103 and 104 avoids the conventional need for a US-IE being carried in poll frames from the sleepy radio device and can comprise one of the following for the sleepy radio device changing its Rx channel for communicating with the first radio device:

1. Make the sleepy radio device's channel the same as the channel on which the first radio device is listening at the time of the sleepy radio device's transmission of a poll frame, where the sleepy radio device knows the channel on which the first radio device is listening at any given time from the first radio device's Rx hopping sequence that it has.
2. Obtaining the sleepy radio device's Rx channel as a function of the channel (not the same channel) on which the first radio device is listening at the time of the sleepy radio device's transmission of the poll frame. Both the first radio device and sleepy radio device have this same function.
3. Wait for the first radio device to hop to a predetermined Rx channel, say channel x, such that the output of a function say f(x), such as a linear function such as 2x, that would yield a channel say 'y', where 'y' is the desired Rx channel to which the sleepy radio device moves to. Again, both devices have this same function.

A function such as a linear function (case 2 or 3 above) can be known a priori by both the first radio device and the sleepy radio device by setting this information at the time of network deployment, or this information can be exchanged as part of initial control message exchange. The first radio device is able to compute the sleepy radio device's current Rx channel based on the function and the channel on which the poll message from the sleepy radio device B was received. For the case 1 above, the function is a simple "equal to" function (y=x). When this implicit technique is used, the sleepy radio device can still change its Rx channel without the need to explicitly state it using an information element such as an US-IE element, thereby saving network overhead.

The efficient timing information exchange is based on an elapsed duration measured from when a UTT-IE was last received from the first radio device to determine if a UTT-IE will be requested by the sleepy radio device. Timing information when utilized is carried in ACK frames from the first radio device to the sleepy radio device. If the elapsed time duration since the last UTT-IE from the first radio device is large based on the predetermined time duration, such as after the sleepy radio device's wake-up from sleep, then based on clock drift (between the clock in the first radio device and the clock in the sleepy radio device) there is a higher chance for the sleepy radio device to have lost synchronization with the first radio device so that an ACK with UTT-IE is requested by the sleepy radio device, while if the elapsed duration since the last UTT-IE from the first radio device is small, the sleepy radio device can continue to track the first radio device even without the reception of a UTT-IE from the first radio device.

The sleepy radio device thus can indicate the requirement for a UTT-IE from the first radio device using a poll frame which due to the sleep period may be transmitted at a time that is beyond a predetermined time duration measured from when a UTT-IE was last received used to determine if a UTT-IE will be requested. A frame version for the poll frame can be used as an indicator of a request for an ACK with a UTT-IE, or a different frame version used as an indicator of a request for an ACK without a UTT-IE. A single bit can be used for indicating whether or not a UTT-IE is requested thus minimizing overhead. A data frame from the sleepy radio device may also request a UTT-IE with the same frame version as with the poll frame in the unlikely event it is transmitted beyond the predetermined time duration.

One example to indicate the requirement for a UTT-IE is to use the frame version as defined in IEEE 802.15.4. When frame version 0 or 1 is used by the sleepy radio device, the ACK frame as defined in IEEE 802.15.4 spec without a UTT-IE is transmitted to the sleepy radio device. When frame version 2 is used by the sleepy radio device, the ACK frame as defined in Wi-SUN FAN spec with a UTT-IE is transmitted to the sleepy radio device. The sleepy radio device can thus change its the frame version to request a UTT-IE or not from the first radio device based comparing the elapsed time from the last UTT-IE received from the first radio device to predetermined time duration. Since for disclosed USCH communications UTT-IEs are now restricted to only ACK frames and also only included in ACK frames on as needed basis, this greatly reduces the network overhead. The modified frame exchange sequence including a disclosed implicit exchange of channel information for reduced overhead USCH network communications is shown FIG. 2.

Figure 2:
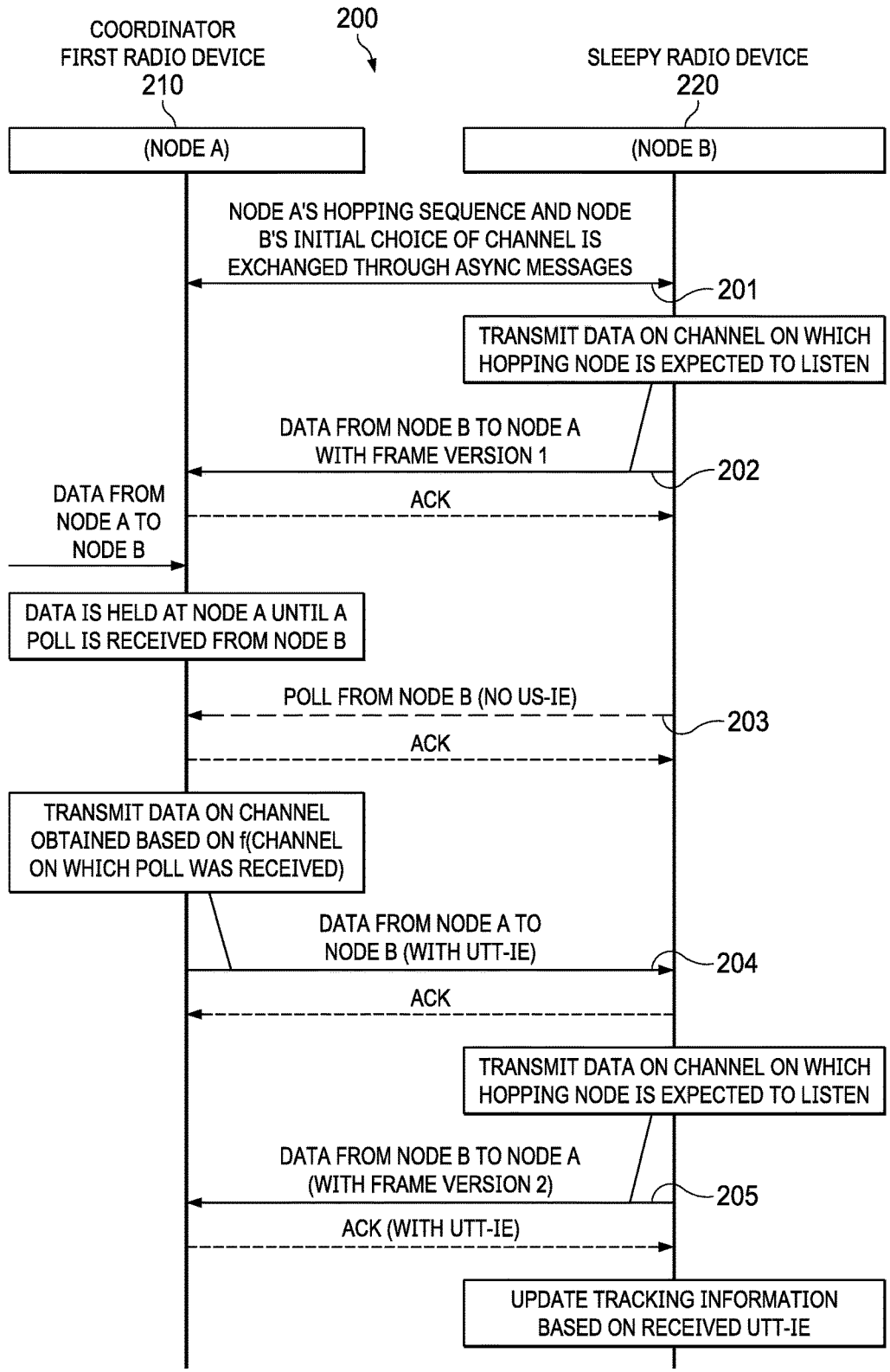
FIG. 2 shows a time sequence of steps in a more detailed example method of USCH network communications including implicit exchange of channel information along with optional efficient timing information exchange for reduced overhead network synchronization, according to an example embodiment.

FIG. 2 shows a time sequence of steps in a more detailed example method 200 of USCH network communications including implicit exchange of channel information along with optional efficient timing information exchange for reduced overhead network synchronization, according to an example embodiment. As described above, there are two types of data exchange, being from the sleepy radio device to the first radio device which can happen by a simple data transfer from the sleepy radio device to the first radio device on the first radio device's channel as the first radio device A will be On all the time, and from the first radio device 210 to the sleepy radio device 220. The first radio device 210 cannot send frames at any time to the sleepy radio device 220 as the sleepy radio device 220 may be sleeping. The first radio device 210 can thus send a frame only after receiving a poll frame from the sleep radio device 220.

Step 201 comprises the first radio device 210 and sleepy radio device 220 using asynchronous messaging exchanging the first radio devices 210 hopping sequence and the sleepy radio device's initial choice of Rx channel. Step 202 comprising the sleepy radio device transmitting a data frame 202 to the first radio device 220 on the channel the first radio device 210 is expected to be listening from the hopping schedule. The first radio device 210 is shown sending an ACK responsive to the data frame from the sleepy radio device 220. In FIG. 2 it is assumed that the time between step 202 comprising the sleepy radio device transmitting a data frame to the first radio device and the receiving of the timing information obtained in step 201 by the sleepy radio device 220 from the Async messages 201 that carried the timing information is less than the predetermined time duration so there is no need to obtain a timing IE again. However, if the time difference between step 202 and 201 is higher than the predetermined time duration the threshold time step 202 comprising the sleepy radio device transmitting a data frame 202 to the first radio device's ACK responsive to data frame from the sleepy radio device 220 can include a frame version that prompts the first radio device 210 to send the ACK with a UTT-IE to the sleepy radio device.

Method 200 shows the first radio device 210 having data for the sleepy radio device 220 holding this data until a poll frame is received from the sleepy radio device 220 to ensure the sleepy radio device 220 is awake to receive the data. Step 203 comprises the sleepy radio device tracking the first radio device's Rx channel using the channel hopping sequence and transmitting a poll frame exclusive of a US-IE on the first radio device's current Rx channel to the first radio device 210. Step 204 comprises the first radio device 210 receiving the poll frame and then computing the sleepy radio device's updated Rx channel the function of the current Rx channel, and then the first radio device 210 transmitting a data frame to the sleepy radio device 220 on the sleepy radio device's updated Rx channel. The sleepy radio device 220 is shown transmitting an ACK responsive to the first radio device 210 transmitting it the data frame. The sequence for poll and data in method 200 then ends after this ACK.

Step 205 shows the optional extra step of the sleepy radio device 220 moving to an updated Rx channel that is a function of the current Rx channel and transmitting a data frame with frame version 2 to the first radio device 220 on the channel the first radio device 210 is then expected to be listening from the hopping schedule. This illustrates the transmission of a data frame with frame version 2 by the sleepy radio device 220 because of generally sleep causing the predetermined time threshold to be exceeded to illustrate two versions of frames (version 1 in step 202 and version 2 in step 205).

Figure 3:
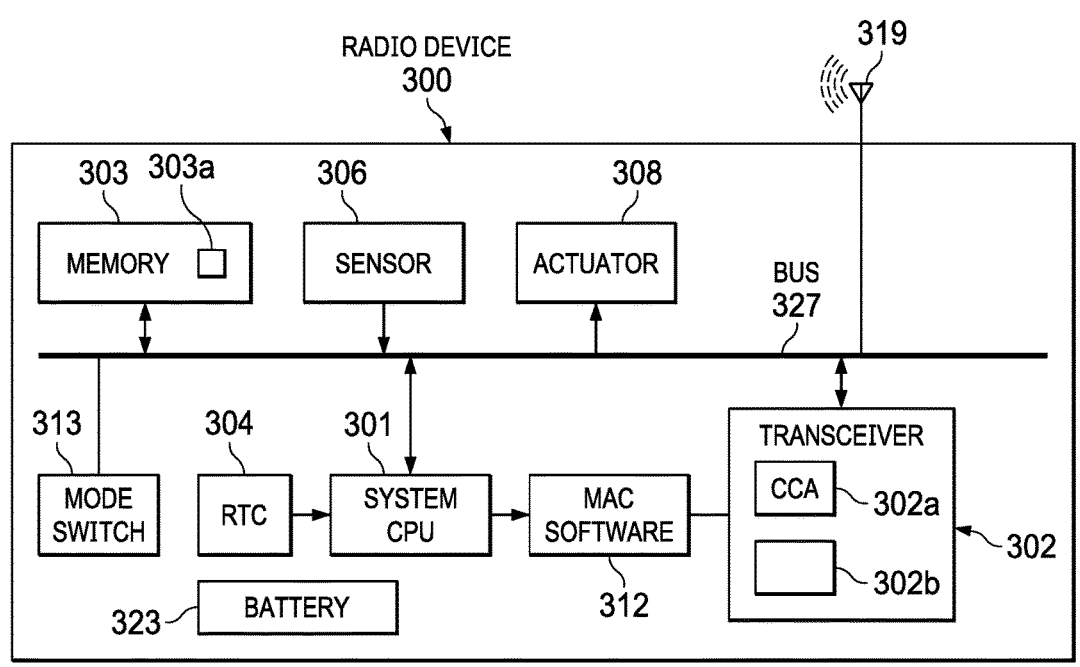
FIG. 3 shows the components of an example wireless radio device that includes code for implementing disclosed USCH network communications including implicit exchange of channel information along with optional efficient timing information exchange for reduced overhead network synchronization, according to an example embodiment.

FIG. 3 shows the components of an example wireless radio device 300 that is shown including code 303a including code for implementing disclosed USCH network communications including implicit exchange of channel information algorithm. Wireless radio device 300 is shown including a system processor (shown as system central processing unit (CPU)) 301 that includes a nonvolatile memory 303 (e.g., static random-access memory (SRAM)) for holding instructions (code) and data. Nonvolatile memory 303 may store software program instructions that may be executed by the system CPU 301 and/or the transceiver 302 to perform some or all of the network functions described herein, for example the code 303a for running disclosed USCH network communications algorithm.

A bus 327 couples together the respective components of the wireless radio device 300. Transceiver 302 is coupled to the antenna 319. Transceiver 302 is shown including a Clear Channel Assessment (CCA) block 302a that generally comprises at least one comparator.

FIG. 3 also shows hardware including digital logic 302b for implementing the network synchronization algorithm shown within the transceiver 302. Although code 303a for implementing a disclosed USCH network communications including implicit exchange of channel information algorithm and hardware including digital logic 302b for implementing this algorithm are both shown in FIG. 3, only one of these is generally needed for implementing method 100 or method 200 described above.

The processor shown as system CPU 301 is shown coupled to a real-time clock (RTC) 304 and to the transceiver 302. The USCH network communications algorithm in the code 303a or the hardware 302a including digital logic for implementing the USCH network communications algorithm operates together a mode switch 313 that can be automatic or manual for mode switching for configuring the wireless radio device 300 to select between a channel hopping coordinator first radio device role and a fixed or semi-channel hopping sleepy radio device role.

Wireless radio device 300 is also shown having a MAC software block 312 where its function may be performed by software executed on the system CPU 301. Wireless radio device 300 is shown powered by a battery 323. One or more sensors 306 and/or one or more actuator circuits 308 may be included in the wireless radio device 300 for interacting with the physical world.

Disclosed implicit exchange of channel information for reduced overhead USCH network synchronization is particularly advantageous for low data rate networks for which network overhead becomes precious. Disclosed USCH network synchronization saves network overhead by the implicit exchange of channel information and reduced timing information exchanges based on elapsed time. Disclosed USCH network synchronization also improves network capacity by reducing the transmission time needed to transmit frames and improves battery life by reducing the power consumption required to transmit and receive frames.

Disclosed subject matter can be used in a variety of applications. One application has a plurality of disclosed radio devices as end devices that include a sensor 306 or an actuator 308. In this embodiment the USCH communications network is part of a smart grid that can comprise for example an electricity supply network which uses digital communications to detect and react to local changes in electrical usage. Other example uses include for industrial automation and home automation.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A method of un-slotted channel hopping (USCH) network synchronization, the method comprising:
    obtaining, by a low power device, an initial receive channel of a second device, using a channel hopping sequence;

transmitting, by the low power device to the second device, a poll frame exclusive of a unicast schedule information element (US-IE), on the initial receive channel of the second device;

moving, by the low power device, to an updated receive channel, by determining the updated receive channel based on the initial receive channel; and receiving, by the low power device from the second device, a data frame on the updated receive channel.

2. The method of claim 1, further comprising:

in response to determining that an elapsed time duration after the second device transmitted a unicast timing information element (UTT-IE) is greater than a predetermined time duration:

requesting, by the low power device, using the poll frame using a second frame version an acknowledgment (ACK) frame with an updated UTT-IE from the second device; and receiving, by the low power device from the second device, an ACK frame that provides updated timing information carried in a UTT-IE; and in response to determining that the elapsed time duration is less than the predetermined time duration, requesting, by the low power device, using the poll frame using a first frame version, an ACK frame that does not contain a UTT-IE.

3. The method of claim 2, wherein a single bit in the poll frame differentiates the first frame version from the second frame version.

4. The method of claim 1, wherein determining the updated receive channel comprises selecting a same channel for the updated receive channel as a channel on which the second device is listening at a time of the low power device transmitting the poll frame.

5. The method of claim 1, wherein determining the updated receive channel comprises selecting a different channel for the updated receive channel on which the second device is listening at a time of the low power device transmitting the poll frame.

6. The method of claim 5, wherein determining the updated receive channel further comprises waiting for the second device to hop to a predetermined channel to generate an updated receive channel y.

7. The method of claim 1, wherein the low power device is powered by only one or more batteries.

8. The method of claim 1, wherein the low power device is an end device in a network.

9. The method of claim 1, wherein the low power device includes a sensor or an actuator.

10. A method of un-slotted channel hopping (USCH) network synchronization, the method comprising:

receiving, by a first device from a low power device, a poll frame exclusive of a unicast schedule information element (US-IE) on a current channel of the first device;

computing, by the first device an updated receive channel based on the current channel, after receiving the poll frame; and receiving, by the first device from the low power device, data, on the updated receive channel.

11. A low power device, comprising:
a processor; and
a non-transitory computer readable storage medium storing a program for execution by the processor, the program including instructions to:
obtain an initial receive channel of a second device, using a channel hopping sequence;
transmit, to the second device, a poll frame exclusive of a unicast schedule information element (US-IE), on the initial receive channel of the second device;
move, by the low power device, to an updated receive channel, by determining the updated receive channel based on the initial receive channel; and
receive, from the second device, a data frame on the updated receive channel.

12. The low power device of claim 11, wherein the instructions further comprise instructions to:
in response to determining that an elapsed time duration after the second device transmitted a unicast timing information element (UTT-IE) is greater than a predetermined time duration:
request, by the low power device, using the poll frame using a second frame version an acknowledgment (ACK) frame with an updated UTT-IE from the second device; and
receive, from the second device, an ACK frame that provides updated timing information carried in a UTT-IE; and
in response to determining that the elapsed time duration is less than the predetermined time duration, request, by the low power device, using the poll frame using a first frame version, an ACK frame that does not contain a UTT-IE.

13. The low power device of claim 12, wherein a single bit in the poll frame differentiates the first frame version from the second frame version.

14. The low power device of claim 11, wherein the instructions to determine the updated receive channel comprise instructions to select a same channel for the updated receive channel as a channel on which the second device is listening at a time of the low power device transmitting the poll frame.

15. The low power device of claim 11, wherein the instructions to determine the updated receive channel comprise instructions to select a different channel for the updated receive channel on which the second device is listening at a time of the low power device transmitting the poll frame.

16. The low power device of claim 15, wherein the instructions to determine the updated receive channel further comprise instructions to wait for the second device to hop to a predetermined channel to generate an updated receive channel y.

17. The low power device of claim 11, wherein the low power device is powered by only one or more batteries.

18. The low power device of claim 11, wherein the low power device is an end device in a network.

19. The low power device of claim 11, wherein the low power device comprises a sensor or an actuator.

* * * * *